(No Model.)
2 Sheets—Sheet 1.
N. CHAPMAN.
BREAD CUTTER.
No. 318,694.
Patented May 26, 1885.
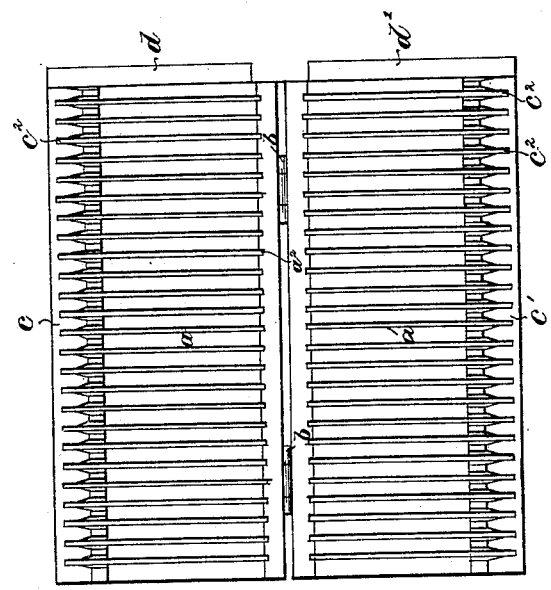
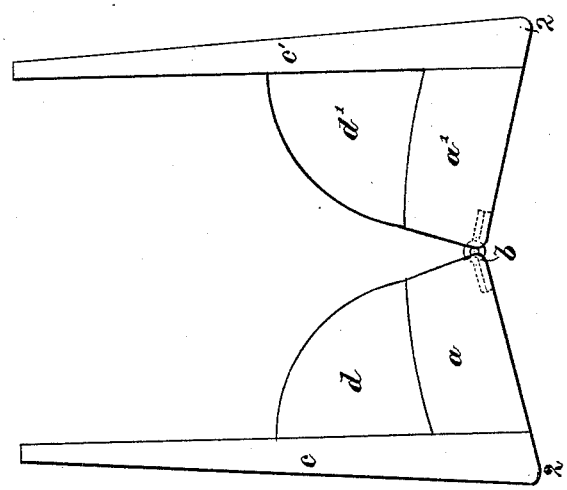
Witnesses
Henry Marsh.
B. J. Noyes.
Inventor,
Nathan Chapman.
by Crosby & Gregory Atty.
N. PETERS. Photo-Lithographer, Washington, D. C.

(No Model.)  2 Sheets—Sheet 2.

N. CHAPMAN.
BREAD CUTTER.

No. 318,694.  Patented May 26, 1885.

Witnesses.

Inventor.
Nathan Chapman
By Crosby & Gregory
Atty's

UNITED STATES PATENT OFFICE.

NATHAN CHAPMAN, OF NANTUCKET, MASSACHUSETTS.

BREAD-CUTTER.

SPECIFICATION forming part of Letters Patent No. 318,694, dated May 26, 1885.

Application filed June 16, 1884. (No model.)

*To all whom it may concern:*

Be it known that I, NATHAN CHAPMAN, of Nantucket and Nantucket county, State of Massachusetts, have invented an Improvement in Bread-Cutters, of which the following description, in connection with the accompanying drawings, is a specification, like letters on the drawings representing like parts.

My invention has for its object to produce a convenient and inexpensive apparatus for holding a loaf of bread and guiding a knife so as to cut the said loaf squarely across into slices of uniform thickness.

The apparatus consists, essentially, of a cutting-bed divided longitudinally into two parts, each part having a knife-guiding and loaf-holding upright rigidly connected to it, and the said parts are hinged together so as to permit the uprights to turn toward one another until they come to a bearing upon the sides of the loaf placed upon the bed, thus holding it securely. The uprights are inclined with relation to the cutting-bed, so that when opened to receive a loaf the said bed will rest upon a table or other support along its edges, and the two parts will thus tend by the weight of the loaf and the pressure of the knife to turn on the hinge in the direction to move the uprights toward one another to press them against the loaf. The upper surface of the cutting-bed, upon which the loaf rests, is provided with grooves in line with the slits of the uprights, and the said surface is curved, so that in whatever position the parts may be with relation to one another the knife will have an opportunity to pass wholly through the loaf. Guiding and holding pieces are provided for the end of the loaf, which also serve to support the slices after they are severed from the loaf before they are removed from the apparatus, so that the slices already cut are retained in position and support the portion of the loaf from which the next slice is being cut.

Figure 3:
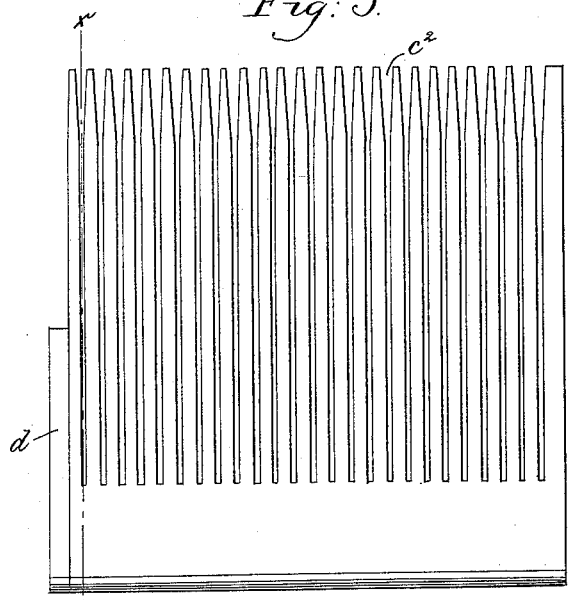
Figure 4:
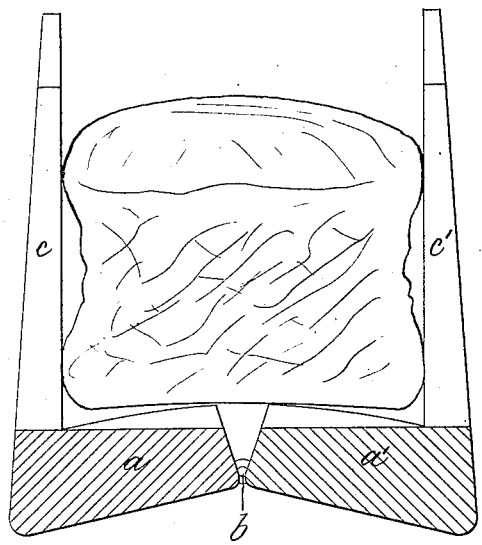

Figure 1 is an end elevation of an apparatus for cutting bread embodying this invention; Fig. 2, a plan view thereof. Fig. 3 is a side elevation thereof; and Fig. 4, a cross-section of Fig. 3, taken on the dotted line $x\, x$, showing a loaf of bread in position to be cut.

The apparatus consists, essentially, of a cutting-bed, $a\, a'$, divided longitudinally into two parts, pivotally connected together by suitable hinges or pivots, $b$, and each provided with a knife-guiding and loaf-holding upright, $c\, c'$, having a series of slits, $c^2$, which serve to guide the blade of a knife through a loaf resting upon the bed $a\, a'$ and held between the uprights $c\, c'$. The two parts of the bed $a\, a'$ are provided with grooves $a^2$ in line with the slits $c^2$, to thus permit the knife to pass wholly through the loaf. The uprights $c\, c'$ are inclined with relation to the under surface of the bed $a\, a'$, so that when the latter rests flatly upon a table or other support the uprights $c\, c'$ will lean toward one another until they nearly or quite meet at their upper ends, and when the latter are separated by turning the two parts of the apparatus on the hinges $b$, in order to receive a loaf between them, the apparatus will be supported only at its outer edge, as shown at 2, Fig. 1, and the downward force on the bed $a\, a'$ from the weight of the loaf and the pressure of the knife will tend to turn the uprights toward one another, pressing them tightly against the sides of the loaf, so that they will hold the latter firmly.

The upper surface of the bed $a\, a'$, upon which the loaf rests, is curved, as shown in Fig. 1, thus holding the entire loaf above the bottoms of the grooves $a^2$, so that the knife will pass wholly through the loaf in whatever position the parts $a\, c, a'\, c'$ may be with relation to one another, according to the size of the loaf held by them.

The parts $a\, c, a'\, c'$ are provided with end pieces, $d\, d'$, which receive the end of the loaf and support the slices as they are severed one after another from the loaf by passing the knife through the slits $c^2$ successively, beginning with the one nearest the said end pieces, the slices thus being retained in position until a sufficient number are cut, when they may all be removed from the apparatus and the loaf moved up to the end pieces, $d\, d'$, when it is subsequently desired to cut more.

I claim—

1. A bread-cutting apparatus composed of a bed and slitted knife-guiding and loaf-holding uprights firmly secured at the sides thereof, the said bed being made in two parts hinged together at their inner sides, whereby the uprights may be moved toward each other on the hinge or axis of the bed to bear against the sides of the loaf and hold the same, substantially as described.

2. In a bread-cutting apparatus, the bed made in two portions pivotally connected together, combined with the slitted knife-guiding and loaf-holding uprights connected with the sides of the said blade and inclined with relation thereto, whereby when the uprights are separated to receive a loaf between them the base is supported at its edges only, and thus tends to press the said uprights toward one another, substantially as and for the purpose described.

3. The bed made in two portions hinged together, and having its upper surface curved, as described, combined with the knife-guiding and loaf-holding uprights connected with the said bed, substantially as described.

4. The sectional hinged bed combined with the slotted uprights $c$ $c'$, firmly secured thereto, having a pivotal movement toward each other on the hinge or axis of the bed, and end pieces, $d$ $d'$, connected with the said bed-sections, substantially as described.

In testimony whereof I have signed my name to this specification in the presence of two subscribing witnesses.

NATHAN CHAPMAN.

Witnesses:
  JOS. P. LIVERMORE,
  W. H. SIGSTON.